(12) United States Patent
Lewis et al.

(10) Patent No.: US 9,304,475 B2
(45) Date of Patent: Apr. 5, 2016

(54) SYSTEMS AND METHODS FOR REMANUFACTURING IMAGING COMPONENTS

(71) Applicant: Static Control Components, Inc., Sanford, NC (US)

(72) Inventors: Lawrence Dale Lewis, Sanford, NC (US); Donald R. Huck, Sanford, NC (US)

(73) Assignee: Static Control Components, Inc., Sanford, NC (US)

( * ) Notice: Subject to any disclaimer, the term of this patent is extended or adjusted under 35 U.S.C. 154(b) by 0 days.

(21) Appl. No.: 14/743,035

(22) Filed: Jun. 18, 2015

(65) Prior Publication Data

US 2015/0286183 A1    Oct. 8, 2015

Related U.S. Application Data

(63) Continuation of application No. 12/858,930, filed on Aug. 18, 2010, now Pat. No. 9,063,506, which is a continuation-in-part of application No. 11/825,262, filed on Jul. 5, 2007, now Pat. No. 7,813,676.

(51) Int. Cl.
| | | |
|---|---|---|
| *G03G 15/00* | (2006.01) |
| *G03G 21/18* | (2006.01) |
| *F16D 1/112* | (2006.01) |
| *F16D 1/108* | (2006.01) |
| *F16D 1/10* | (2006.01) |

(52) U.S. Cl.
CPC .............. *G03G 15/757* (2013.01); *F16D 1/112* (2013.01); *G03G 21/1857* (2013.01); *F16D 1/108* (2013.01); *F16D 2001/102* (2013.01)

(58) Field of Classification Search
CPC .... F16D 1/112; F16D 1/108; F16D 2001/102
See application file for complete search history.

(56) References Cited

U.S. PATENT DOCUMENTS

| | | | | |
|---|---|---|---|---|
| 7,236,722 B2 * | 6/2007 | Portig | ................ | G03G 21/1676 399/121 |
| 8,897,673 B2 * | 11/2014 | Lee | ...................... | G03G 15/757 399/111 |
| 2003/0059233 A1 * | 3/2003 | Jang | ........................ | F16D 1/101 399/167 |
| 2004/0190937 A1 * | 9/2004 | Mercer | .............. | G03G 15/0872 399/117 |
| 2007/0140735 A1 * | 6/2007 | Karz | .................... | G03G 15/757 399/167 |

* cited by examiner

*Primary Examiner* — David Gray
*Assistant Examiner* — Tyler Hardman

(57) ABSTRACT

A drive gear for a generally cylindrical imaging component. The drive gear includes a body for engaging the generally cylindrical imaging component; a cylindrical shaft attached to the body, the cylindrical shaft having an end surface; and three prongs extending longitudinally outward from the end surface. Each prong may include an extension member extending perpendicular to the prongs and the cross-sectional area of the extension members may be less than the cross-sectional area of the prongs.

3 Claims, 7 Drawing Sheets

SYSTEMS AND METHODS FOR REMANUFACTURING IMAGING COMPONENTS

The present application is a continuation of allowed U.S. patent application Ser. No. 12/858,930 filed Aug. 18, 2010 which is a continuation-in-part of U.S. patent application Ser. No. 11/825,262 filed Jul. 5, 2007, now U.S. Pat. No. 7,813,676, both of which are incorporated by reference in their entirety.

BACKGROUND

The present invention generally relates to manufacturing, remanufacturing or repairing replaceable imaging components, and more particularly to apparatus and techniques for providing a drive gear or a non-drive gear for a drum or roller, such as an organic photo conductor (OPC) drum, for example, of a replaceable imaging cartridge adapted for holding marking material, such as toner.

In the imaging industry, there is a growing market for the remanufacture and refurbishing of various types of replaceable imaging cartridges such as toner cartridges, drum cartridges, inkjet cartridges, and the like. These imaging cartridges are used in imaging devices such as laser printers, xerographic copiers, inkjet printers, facsimile machines and the like, for example. Imaging cartridges, once spent, are unusable for their originally intended purpose. Without a refurbishing process these cartridges would simply be discarded, even though the cartridge itself may still have potential life. As a result, techniques have been developed specifically to address this issue. These processes may entail, for example, the disassembly of the various structures of the cartridge, replacing toner or ink, cleaning, adjusting or replacing any worn components and reassembling the imaging cartridge.

Laser printer toner cartridges are typically composed of two portions. One of these sections is the waste bin assembly which houses the OPC drum. The OPC may include a drive gear which engages with a printer drive member. During the remanufacturing of a laser printer toner cartridge, the OPC drum may need to be replaced due to the wear or damage of the OPC drum. The replacement OPC drum may include a replacement drive gear attached to one end of the replacement OPC drum and a replacement non-drive hub attached to the opposing end of the replacement OPC drum. The present invention provides for an improved replacement drive gear and a replacement non-drive hub.

SUMMARY

In one aspect of the present invention, a drive gear for a generally cylindrical imaging component includes a body for engaging the generally cylindrical imaging component; a cylindrical shaft attached to the body, the cylindrical shaft having an end surface; and three prongs extending longitudinally outward from the end surface, each prong including an extension member extending perpendicular to the prongs, wherein the cross-sectional area of the extension members is less than the cross-sectional area of the prongs.

A more complete understanding of the present invention, as well as further features and advantages of the invention, will be apparent from the following detailed description and the accompanying drawings.

DETAILED DESCRIPTION

The following detailed description of preferred embodiments refers to the accompanying drawings which illustrate specific embodiments of the invention. In the discussion that follows, specific systems and techniques for providing a drive gear for a drum or roller, such as an organic photo conductor (OPC) drum, for example, of a replaceable imaging cartridge adapted for holding marking material, are disclosed. Other embodiments having different structures and operations for the repair, remanufacture and operation of other types of replaceable imaging components and for various types of imaging devices, such as laser printers, inkjet printers, copiers, facsimile machines and the like, do not depart from the scope of the present invention.

Figure 1:
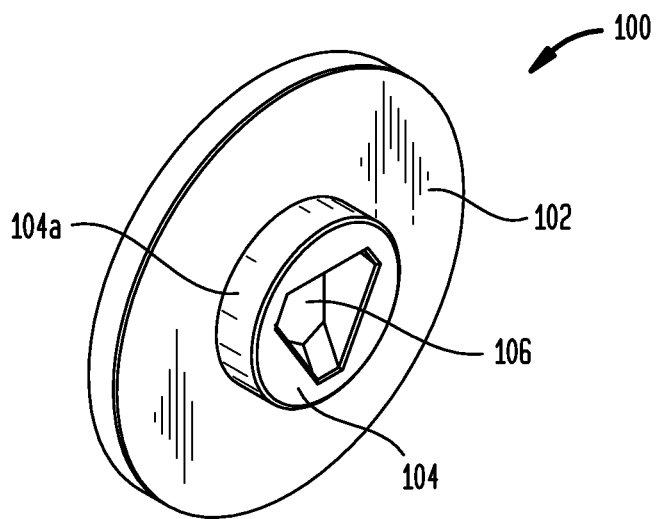
FIG. 1 shows a perspective view of a prior art drive mechanism.

FIG. 1 shows a prior art drive mechanism 100. The drive mechanism 100 may include a body 102 having a raised section 104. A helical recess 106 may be formed in the raised section 104. The raised section 104 may include an outer cylindrical surface 104a. In operation, the drive mechanism 100 is part of a printer and engages a gear (not shown) having a shaped helical extrusion on an imaging cartridge, and causes the gear with the helical extrusion to rotate. Further details of such a prior art drive mechanism 100 and gear are disclosed in U.S. Pat. No. 6,400,914 which is incorporated by reference herein in its entirety.

Figure 2:
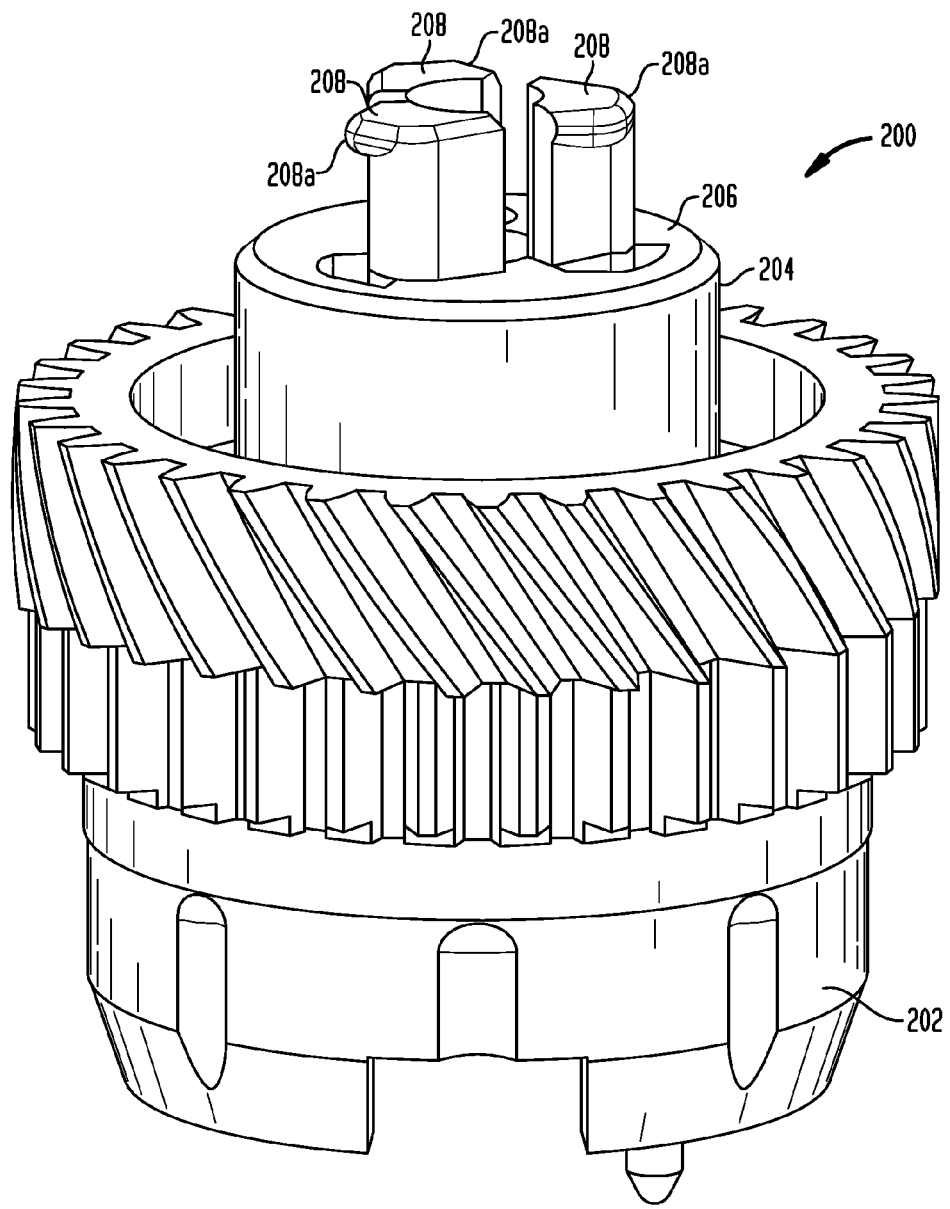
FIGS. 2 and 3 show perspective views a drive gear in accordance with an aspect of the present invention.
Figure 3:
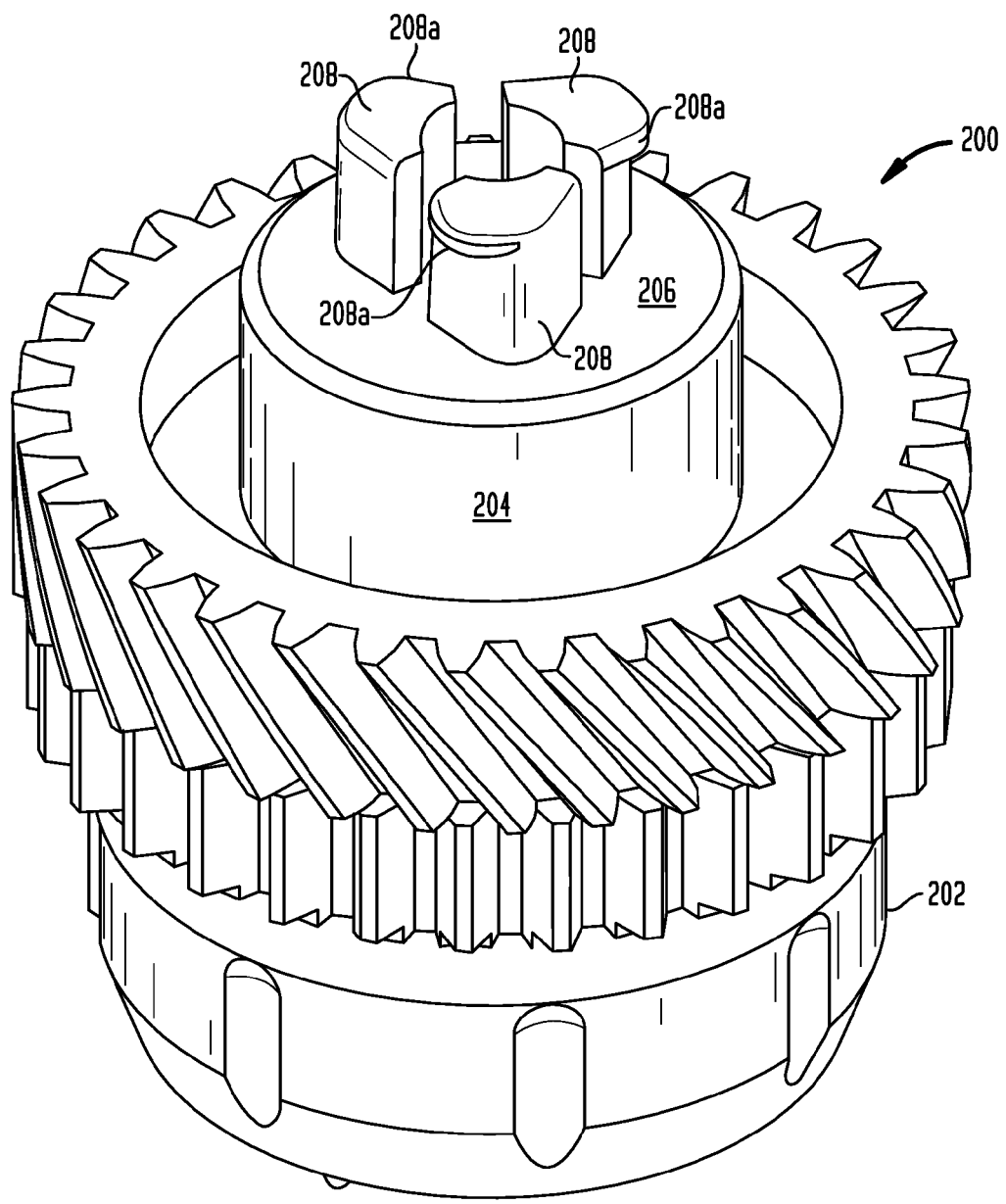
Figure 4:
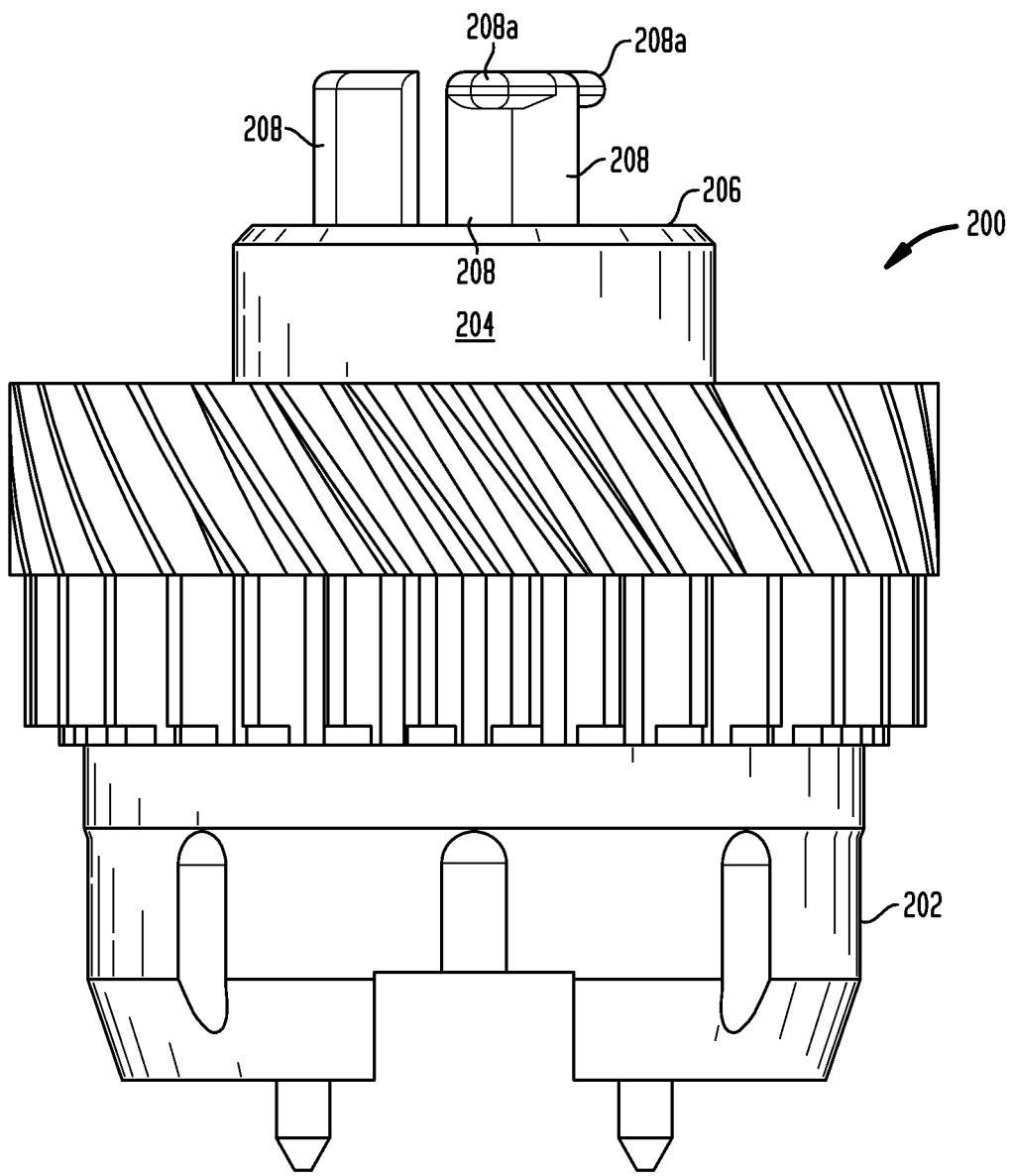
FIG. 4 shows a side view of a drive gear in accordance with an aspect of the present invention.
Figure 5:
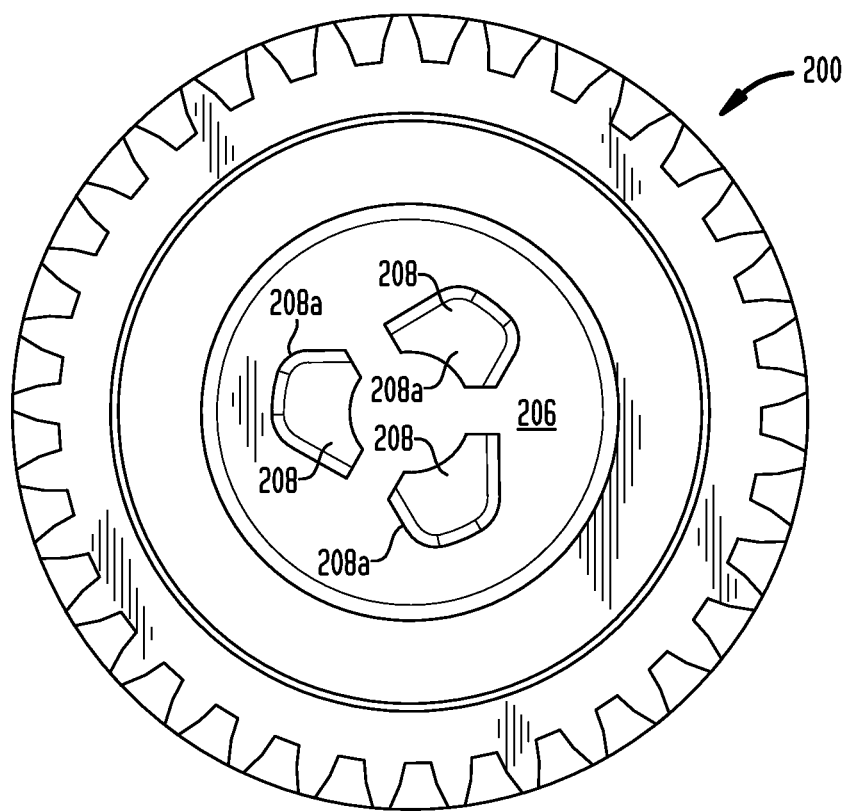
FIG. 5 shows an end view of a drive gear in accordance with one aspect of the present invention.

FIG. 2 shows a drive gear 200 in accordance with the present invention. One end of the drive gear 200 is adapted to be attached to a hollow roller or generally cylindrical imaging component, such as an OPC drum. The other end of the drive gear 200 is adapted to engage the helical recess 106 of the drive mechanism 100 of a printer. The drive gear 200 includes a body 202 for engaging the generally cylindrical imaging component and a cylindrical shaft 204 attached to the body 202. The cylindrical shaft 204 has an end surface 206. Three prongs 208 extend longitudinally outward from the end surface 206 and are shaped to engage the helical recess 106 of the drive mechanism 100. Each of the three prongs 208 may include an extension member 208a extending perpendicular to the prongs 208 and adapted to engage the helical recess 106. As can be seen from the figures, the cross-sectional area of the extension members 208a is preferably less than the cross-sectional area of the prongs 208.

When the user closes a door of the printer, the drive mechanism 100 slides onto the cartridge drive gear 200 so that the three drive gear prongs 208 and the extension members 208a are inserted into the helical recess 106. As the printer drive mechanism 100 rotates, the three prongs 208 with the extension members 208a are engaged, and the entire cartridge drive gear 200 rotates, which in turn drives an OPC (not shown) attached to the drive gear 200. As shown, the drive gear 200 may include one or more gears which drive the rest of the cartridge components in addition to the OPC.

Due to the high torque exerted on the drive gear by some printers, an improper mating of the drive gear to the drive mechanism 100 may cause the drum to skip, run irregular, or may even damage or break the drive member on the OPC drive gear. This may be due to the side-to-side tolerance of the installed OPC drum in the cartridge when engaged with the printer. If the OPC drum is permitted to shift in a direction away from the rotational drive mechanism of the printer, the interface between the cartridge drive gear and the helical recess may be less secure and the corresponding engagement more prone to errors or damage.

Figure 6:
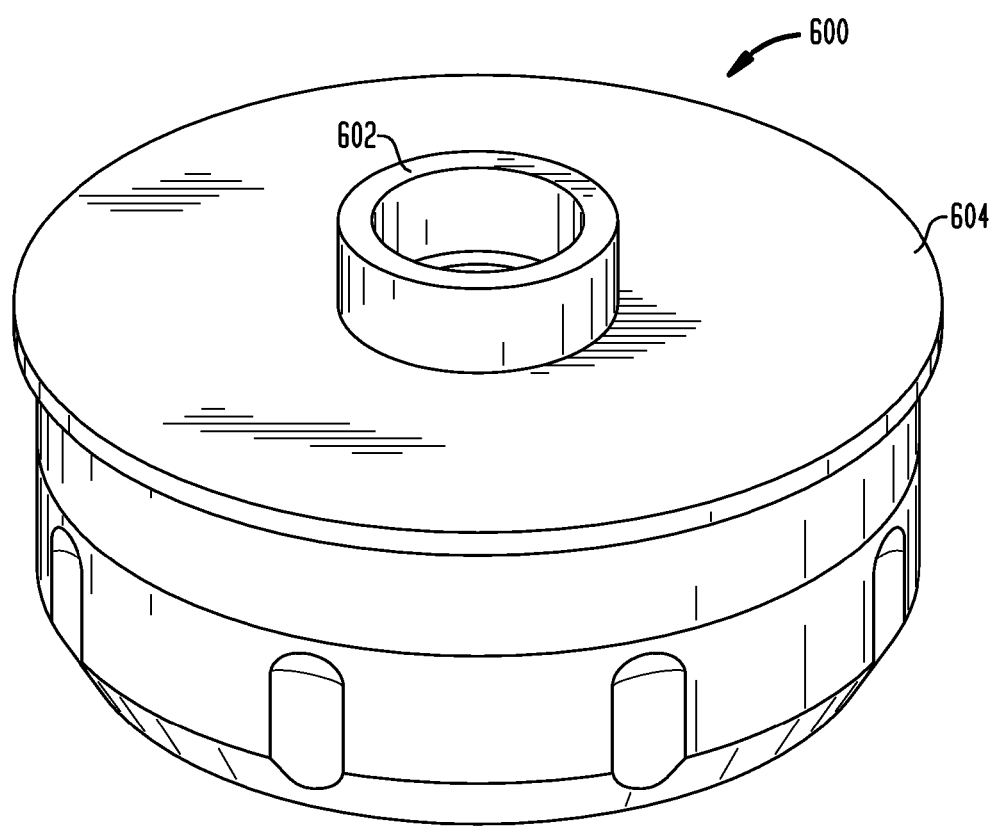
FIG. 6 shows a perspective view of a non-drive hub in accordance with an aspect of the present invention.
Figure 7:
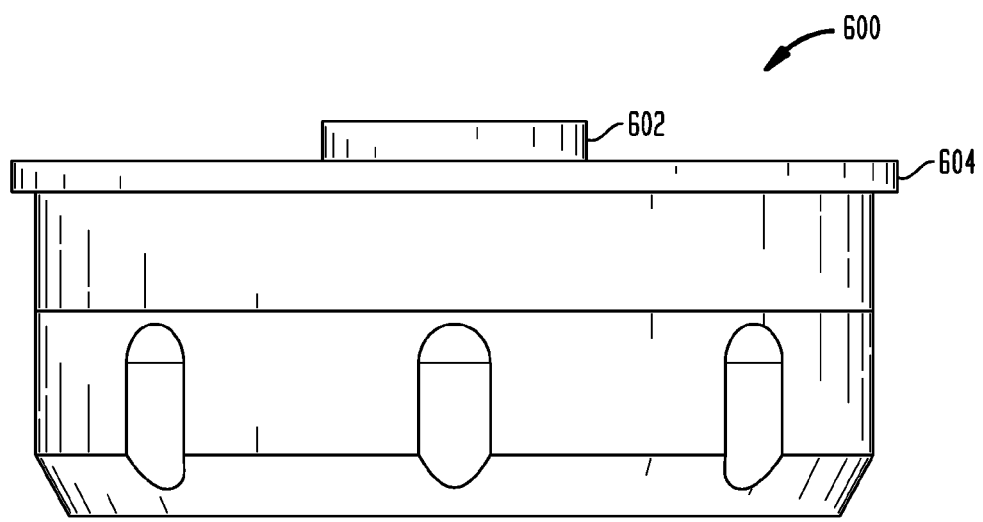
FIG. 7 shows an end view of a non-drive hub in accordance with an aspect of the present invention.

In one aspect of the present invention, as shown in FIGS. 6 and 7, a replacement non-drive hub 600 on the opposing end of the OPC may be utilized to insure proper mating. The non-drive hub may include a ring 602 which reduces the amount of side-to-side movement which is possible. The additional thickness of the ring 602 (when compared to the original non-drive hub) shifts the drive gear 200 toward the drive mechanism 100 of the printer, thereby reducing the amount of side-to-side movement possible. The thickness of the ring 602 may depend upon the amount of shifting which occurs in the particular cartridge. In another aspect, the replacement hub 600 may include a shoulder 604 having an increased thickness (when compared to the original non-drive hub). In another aspect of the present invention, a washer or similar structure may be added to the non-drive hub to reduce the amount of side-to-side movement. In another aspect, a replacement OPC drum having an increased length may be used to reduce the amount of side-to-side movement.

Although specific embodiments have been illustrated and described herein, those of ordinary skill in the art appreciate that any arrangement that is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A drive gear for a generally cylindrical imaging component, the drive gear comprising:
    a body for engaging the generally cylindrical imaging component;
    a cylindrical shaft attached to the body, the cylindrical shaft having an end surface; and
    three prongs extending longitudinally outward from the end surface, each prong including an extension member extending perpendicular to the prongs,
    wherein the cross-sectional area of the extension members is less than the cross-sectional area of the prongs,
    wherein a top surface of the extension members is substantially flat.

2. The drive gear of claim 1 wherein each of the three prongs is generally triangular in shape, one vertex of each triangular shaped prong being generally rounded.

3. The drive gear of claim 1 wherein the three prongs are adapted for engaging a helical recess.

* * * * *